US000001101H

United States Statutory Invention Registration [19]

[11] Reg. Number: H1101

[43] Published: Sep. 1, 1992

Waclawik

[54] STRUCTURAL VIBRATION AND SHOCK ISOLATION IN A HIGH PRESSURE ENVIRONMENT

[75] Inventor: Ronald E. Waclawik, New Bedford, Mass.

[73] Assignee: The United States of America as represented by the Secretary of the Navy, Washington, D.C.

[21] Appl. No.: 359,895

[22] Filed: Jun. 1, 1989

[51] Int. Cl.[5] ..... F16L 55/02

[52] U.S. Cl. ..... 285/49

[58] Field of Search ..... 285/48, 49, 50, 368

[56] References Cited

U.S. PATENT DOCUMENTS

| | | | |
|---|---|---|---|
| 1,231,202 | 6/1917 | Saylor | 285/50 |
| 2,465,669 | 3/1949 | Tudor | 285/48 |
| 2,653,834 | 9/1953 | Purkhiser | 285/50 |
| 2,962,304 | 11/1960 | Lung | 285/48 |
| 3,650,547 | 3/1972 | Tickett | 285/48 X |
| 3,669,471 | 6/1972 | Fetish, Jr. | 285/49 |
| 4,304,530 | 12/1981 | Gens | 285/49 X |
| 4,776,600 | 10/1988 | Kohn | 285/48 X |

*Primary Examiner*—Michael J. Carone
*Attorney, Agent, or Firm*—Michael J. McGowan; Prithvi C. Lall; Michael F. Oglo

[57] ABSTRACT

At the output end of a piping system, components subject to vibration and shock are isolated from components at the input end of the system. The isolation is achieved by a clamping arrangement in which a plurality of deformable isolation material components are inserted between the two ends. The system operates under a high fluid pressure and is arranged to enable the high pressure to act upon the isolation material to assist in forming a seal within the flow path.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

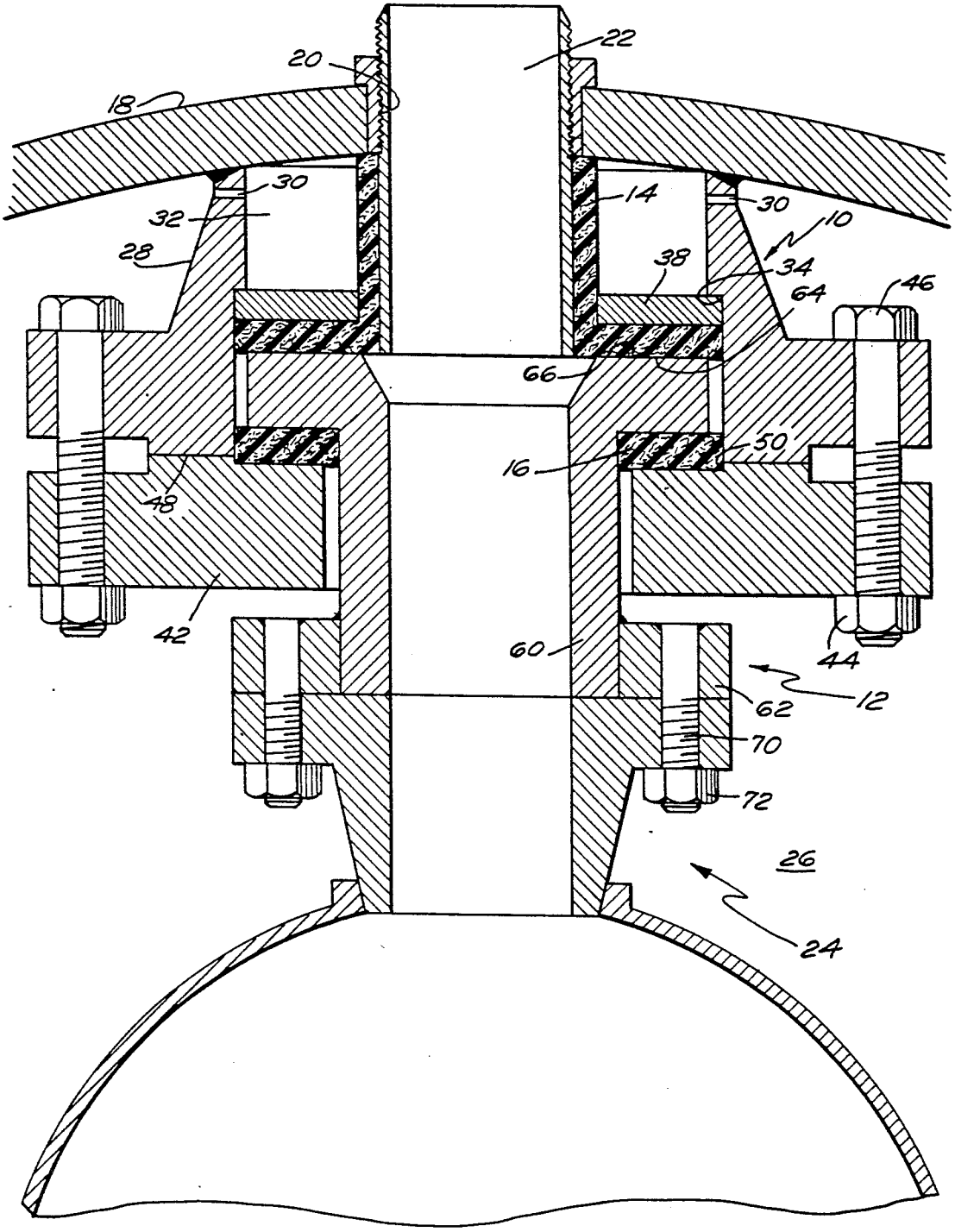
20
22
18
30
14
30
32
10
28
38
34
64
46
66
50
16
48
42
60
44
12
62
70
72
26
24

STRUCTURAL VIBRATION AND SHOCK ISOLATION IN A HIGH PRESSURE ENVIRONMENT

STATEMENT OF GOVERNMENT INTEREST

The invention described herein may be manufactured and used by or for the Government of the United States of America for governmental purposes without the payment of any royalties thereon or therefor.

This patent application is co-pending with related patent application entitled "Structural Vibration and Shock Isolator" by the same inventor filed 1 Jun. 1989, Ser. No. 07/360,179.

BACKGROUND OF THE INVENTION

1. Field of the Invention

The present invention generally relates to piping systems and more particularly a piping system in an enclosed high pressure environment wherein one end is isolated from the shock and vibration of the other end.

2. Description of the Prior Art

There are many piping systems in which one end of the piping will vibrate and it is desirable that this vibration is not transmitted through the piping to the other end of the system. Prior art systems generally use either flexible piping or a bellows arrangement to decouple one end from any shock or vibration at the other end. Another known system uses a plurality of serially aligned 0-rings that form an inner wall of a piping system. The above systems all rely on extensive lengths of decoupling components that form a portion of the inner piping wall to transmit fluids.

SUMMARY OF THE INVENTION

The present invention provides structural vibration and shock isolation to the inlet end of a fluid conducting system where the output end is subject to high axial loads and the fluid conducting system is subject to a high pressure exterior environment The system has an outlet section with a flanged arrangement in which isolation material components are placed both above and below the flange. An inlet section comprises a pipe rigidly attached to a high pressure fluid enclosure. Two pieces in axial alignment form a clamp and are arranged above and below the isolation material components. The clamp has apertures that aid in neutrallizing pressure between separate chambers. The isolation material components are also used to separate the inlet and outlet sections in the radial direction.

BRIEF DESCRIPTION OF THE DRAWING

The figure shows a cross sectional view of a system having a vibration and shock isolation apparatus in accordance with the present invention.

DESCRIPTION OF THE PREFERRED EMBODIMENT

Referring now to the figure there is shown an apparatus for providing vibration and shock isolation in a piping system. The apparatus has an inlet assembly 10, an outlet assembly 12, and isolation material grommets 14 and 16. The inlet assembly 10 is welded to an air over water tank 18 that has a threaded orifice 20 connected to a pipe 22 for supplying a fluid. The outlet assembly 12 is connected to a diffuser 24 which diffuses the fluid within the air over water tank chamber 26.

The inlet assembly 10 comprises a weld neck flange 28 that is the main structural connection between the inlet assembly 10 and pipe 22. In the present embodiment the weld neck flange 28 is welded directly to the dome of the air over water tank 18. The pipe 22 is threaded to the air over water tank 18 thus completing the connection between the weld neck flange 28 and the pipe 22. In the present arrangement the weld neck flange 28 is a standard off-the-shelf item that is modified with vent apertures 30 for equalizing pressure in a chamber 32 and further modified with a counterbored recess 34 for alignment of components. A steel disc 38 is inserted in the counterbored recess 34. The vent apertures 30 are drilled around the perimeter of the neck portion of flange 28 at a circumferential spacing of sixty degrees. The vent apertures 30 are used for equalizing pressure between chamber 32 and an air over water tank chamber 26. A flange 42 is connected to weld neck flange 28 by nuts 44 and bolts 46 to form a clamp 48. The flange 42 is a standard item that is modified with a counterbored recess 50 for alignment purposes.

The outlet assembly 12 comprises a long weld neck flange 60 inserted in and affixed by welding or other means to a flange 62. The long weld neck flange is axially aligned with the pipe 22. The diffuser 24 is connected to the flange 62 by means of a plurality of studs 70 that are welded to flange 62 and pass through apertures in diffuser 24 to a plurality of nuts 72 that are threaded to respective studs 70.

The structural and vibration isolation is provided by the flanged tubular grommet 14 and the ring grommet 16 which are mounted in a compressed condition (preload). The flanged tubular grommet 14 grips the inner wall of pipe 22 and has a face 64 abutting the face 66 of long weld neck flange 60. Ring shaped grommet 16 abuts the long weld neck flange 60 on the side opposite face 66. Both isolation grommets 14 and 16 are made out of reinforced composite isolation material or other suitable deformable material that causes decoupling between the inlet assembly 10 and outlet assembly 12 when vibration is introduced to either.

In operation as high pressure air is introduced to the diffuser 24 from pipe 22 and long weld neck flange 60, the diffuser 24 will translate its load to the outlet assembly 12 and deflect isolation components 14 and 16 thereby providinq shock and vibration isolation to inlet assembly 10, pipe 22, and air over water tank 18. The preloading of flanged tubular grommet 14 is essential to get a timely deflection. As the chamber 32 is vented to the air over water tank chamber 26 pressure, by means of vent apertures 30, the pressure in chamber 32 will build up and will work with the diffuser 24 load to deflect the grommets 14 and 16. The deflection of the flanged tubular grommet 14 provides a seal to insure properly directed flow to the diffuser 24.

There has therefore been described a piping system that has the ability to structurally isolate input components from output components in applications where either shock loading or vibrational loading is a concern. The design has the inherent ability to withstand high axial loading conditions while at the same time having the ability to dampen/isolate vibration. The design utilizes low cost readily available state-of-the-art devices which leads to economy in construction.

It will be understood that various changes in details, materials, steps and arrangements of parts, which have been herein described and illustrated in order to explain the nature of the invention, may be made by those skilled in the art within the principle and scope of the invention as expressed in the appended claims.

What is claimed is:

1. A system for conducting and containing a fluid having structural vibration and shock isolation for high axial loads on system components comprising:

structural vibration and shock isolation means having a fluid inlet pipe and a fluid outlet component, said structural and shock isolation means for providing vibration and shock isolation between said inlet pipe and said outlet component;

diffusing means comprising a diffuser connected to said vibration and shock isolation means fluid outlet for diffusing said fluid; and an air over water tank enclosing said fluid, said air over water tank rigidly connected to said fluid inlet pipe.

2. A system having structural vibration and shock isolation for high axial loads on system components according to claim 1 wherein said structural vibration and shock isolator further comprises:

a flanged tubular grommet having a flange portion and a tubular portion generally perpendicular to said flange portion, with the interior of the tubular portion thereof gripping the outside wall of said fluid inlet pipe, said flanged tubular grommet having a face of said flange portion thereof aligned with an end of the fluid inlet pipe;

said fluid outlet component comprising a long weld neck flange axially aligned with said fluid inlet pipe for conducting said fluid, said long weld neck flange having a face of said flanged portion thereof abutting the face of the flanged portion of said flanged tubular grommet;

a ring shaped grommet abutting the side opposite said face of the flanged portion of said long weld neck flange; and a clamp abutting the side of the flanged tubular grommet opposite the face and further abutting said ring shaped grommet on the side opposite that abutting said long weld neck flange, said clamp holding said pipe axially aligned with said long weld neck flange, and said clamp rigidly connected to said air over water tank.

3. A system having structural vibration and shock isolation for high axial loads on system components according to claim 2 wherein said clamp further comprises:

a flange having a counterbored section at its inner diameter, said counterbored section abutting said ring shaped grommet on said grommet's outer circumference and on said grommet's side opposite the flanged portion of said long weld neck flange;

a weld neck flange having a counterbored section at its inner diameter, said counterbored section abutting the side opposite the face of the flanged tubular grommet and further abutting said flanged tubular grommet and said ring shaped grommet at their outer circumferences, said weld neck flange being rigidly connected to said air over water tank, and said weld neck flange having a plurality of apertures for equalizing pressure;

said flange and weld neck flange abutting each other at their faces; and fastening means for holding said weld neck flange and said flange in abutment with each other and for applying pressure to said flanged tubular grommet, and said ring shaped grommet.

4. A system having structural vibration and shock isolation for high axial loads on system components according to claim 3 wherein said clamp further comprises a rigid ring intermediate said counterbored section of said weld neck flange and said side opposite said face of said flanged tubular grommet.

5. A system having structural vibration and shock isolation for high axial loads on system components according to claim 4 wherein said fastening means further comprises a plurality of nuts and bolts threaded together.

6. A system having structural vibration and shock isolation for high axial loads on system components according to claim 5 wherein said flanged tubular grommet, and said ring shaped grommet are made of a reinforced composite isolation material.

* * * * *